United States Patent [19]

Simmons et al.

[11] 4,264,949
[45] Apr. 28, 1981

[54] DC TO DC POWER SUPPLY

[75] Inventors: David H. Simmons, Palo Alto; Bradley R. Gunn, Belmont, both of Calif.

[73] Assignee: Litton Systems, Inc., San Carlos, Calif.

[21] Appl. No.: 72,222

[22] Filed: Sep. 4, 1979

[51] Int. Cl.³ .............................................. H02P 13/22
[52] U.S. Cl. ......................................... 363/17; 363/25
[58] Field of Search ................. 363/15, 16, 17, 22–26, 363/97, 98, 132–134, 124

[56] References Cited

U.S. PATENT DOCUMENTS

| 3,846,691 | 11/1974 | Higgins | 363/25 |
| 4,065,713 | 12/1977 | Pollmeier | 323/DIG. 1 |

FOREIGN PATENT DOCUMENTS 604103  4/1978  U.S.S.R. .................................... 363/24

Primary Examiner—William H. Beha, Jr.

[57] ABSTRACT

A regulated DC to DC power supply of reduced complexity which delivers increased power to the load. The improved circuitry substitutes an inductor for the usual inductor-capacitor-switching transistor arrangements, and drives the inverter circuitry so that the on-times of opposite inverter transistors overlap.

5 Claims, 3 Drawing Figures

DC TO DC POWER SUPPLY

BACKGROUND OF THE INVENTION

The invention relates to power supplies and, more particularly, to DC to DC power supplies in which the output voltage is regulated against variations. Such a power supply is often used to provide a high voltage direct current output when only a low voltage direct current source is available.

A typical DC to DC power supply of the prior art comprises an inverter circuit for changing low voltage direct current to alternating current, a transformer having its primary winding connected to the output of the inverter, and a rectifier circuit connecting the load to the secondary winding of the transformer. The inverter circuit of the power supply usually utilizes switching transistors to alternate the direction of the current through the primary winding, and a regulating circuit which senses the output voltage at the load is normally utilized to control the switching of the inverter transistors. The inverter circuit typically includes a separate pre-regulator circuit utilizing an inductor connected between the DC source and the parallel arrangement of a switching transistor and an input capacitor, with the capacitor furnishing input power to the inverter. The switching transistor is enabled to allow current through the inductor to increase for charging the input capacitor. The on-time of the switching transistor in the pre-regulator is controlled by the regulating circuit in response to the output voltage so that the output voltage is held constant.

Such power supplies have a number of disadvantages. The use of a switching transistor with the inductor generates substantial electromagnetic interference. It is also necessary that the transistors of the inverter circuit which switch the current in alternate directions through the primary winding have no conduction overlap because such an overlap will provide a short-circuit of the input capacitor through the switching transistors, resulting in exceedingly high peak currents which will probably damage those transistors. Thus, a period of dead time is left between current in alternate directions. This dead time causes a loss of power between the input and the output and enlarges the output voltage ripple. If the dead time of the switching transistors in the inverter can be reduced or eliminated, these disadvantages will be substantially reduced.

It is an object of the present invention to provide a new and improved DC to DC power supply.

It is another object of the present invention to provide a DC to DC power supply having increased power handling capabilities.

It is still another object of the present invention to provide a simpler, more compact DC to DC power supply having better operating characteristics than prior art power supplies.

SUMMARY OF THE INVENTION

The foregoing and other objects are accomplished in the present invention by a DC to DC power supply which substitutes an inductor for the usual pre-inverter circuitry. The removal of the usual pre-inverter circuitry eliminates the switching which generates most of the electromagnetic interference, eliminates the need for dead time between the switching transistors of the inverter and thereby provides substantially greater power transfer from input to output, reduces peak currents through the inverter transistors so that average currents are raised, and lowers the output voltage ripple. The elimination of this circuitry also provides a simpler, more compact circuit which is capable of functioning with a wider range of input voltages than are prior art DC to DC power supplies.

Other objects, features, and advantages of the invention will become apparent from a reading of the specification taken in conjunction with the drawings in which like reference numerals refer to like elements in the several views.

DESCRIPTION OF THE PRIOR ART

Figure 1:
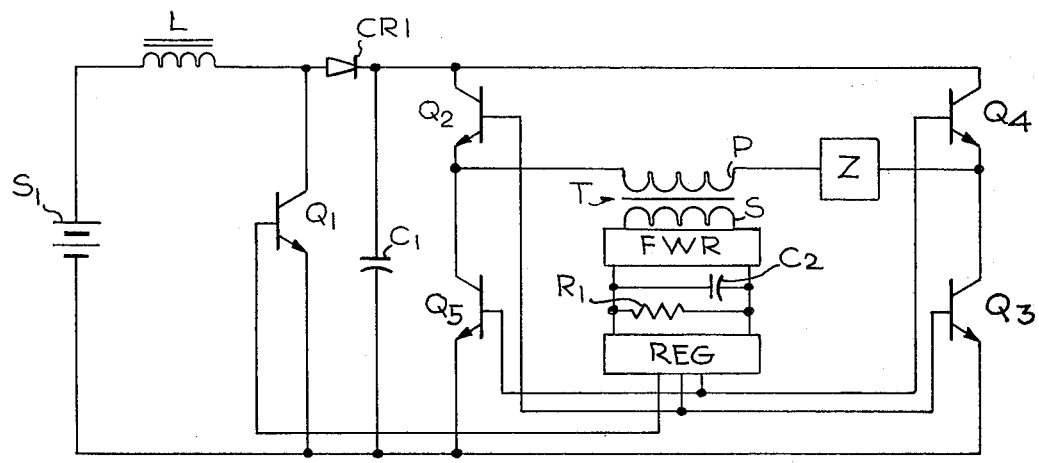
FIG. 1 is a circuit diagram of a prior art DC to DC power supply and illustrates graphically the inputs applied to the switching transistors thereof.
Figure 1:
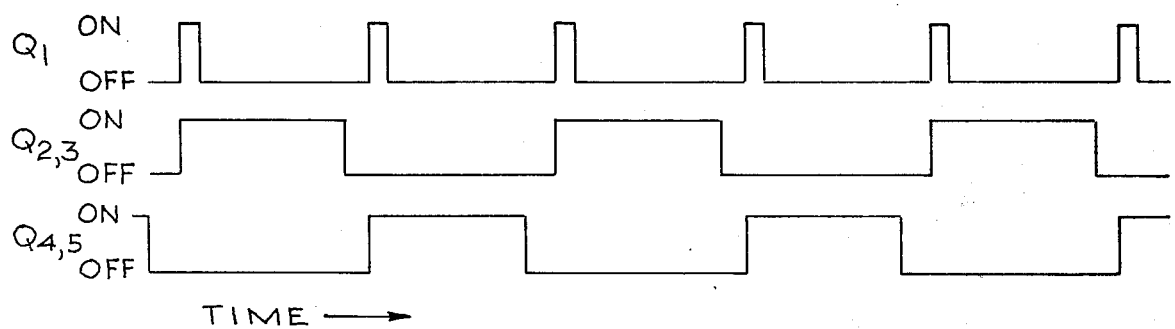

In FIG. 1 is shown a prior art DC to DC power supply. In the power supply shown in FIG. 1, a DC input voltage S1 is connected to a pre-inverter circuit which includes an inductor L, a switching transistor Q1, a diode CR1, and an input capacitor C1. The transistor Q1 is operated to provide a short circuit across the diode CR1 in series with the capacitor C1. The on-time of the switching transistor Q1 is controlled by a regulator circuit REG well known to the prior art which is adapted to enable transistor Q1 so that current through the inductor L may increase for charging the capacitor C1 and output voltage may be held constant. Connected across the capacitor C1 is an inverter circuit including switching transistors Q2, Q3, Q4, and Q5, a primary winding P of transformer T, and an impedance Z. Connected across a secondary winding S of the transformer T is a full wave rectifying circuit FWR, which supplies DC voltage to a capacitor C2 and a load resistor $R_L$. The voltage across the load resistor $R_L$ is measured at the input of the regulator REG.

In operation, the DC voltage S1 is provided to the pre-inverter circuit; and, during the time that transistor Q1 is switched on under control of the regulator REG, current increases through the inductor L due to the short circuit provided through the transistor Q1. During this period the diode CR1 is back biased by the short circuit. At the appropriate point selected to provide sufficient changing current (as shown in the on-off time graph for Q1 in FIG. 1), the transistor Q1 is switched off and the inductor L is allowed to discharge through the diode CR1 to charge the capacitor C1. The operation of the transistor Q1 to increase the current through the inductor L has the disadvantage of generating electromagnetic interference.

The voltage of the charged capacitor C1 is applied across the switching transistors 2, Q3, Q4, and Q5 of the inverter circuit. The regulator REG controls the on-time of the transistors Q2, Q3, Q4, and Q5 so that transistors Q2 and Q3 are conducting while the transistors Q4 and Q5 are off and vice versa. Consequently, the voltage across the capacitor C1 is applied across the primary winding P and the impedance Z in a first direction if transistors Q2 and Q3 are conducting and in a second direction if transistors Q4 and Q5 are conducting.

As may be seen in the graphs of on-off times for the transistors Q2, Q3, Q4, and Q5 provided in FIG. 1, a period is provided (termed a dead period) in which neither pair of transistors of the inverter circuit is conducting. Without this dead period, all of the transistors Q2, Q3, Q4, and Q5 would be conducting coincidentally; and the voltage source provided by the capacitor C1 would be shorted across the pairs represented by the transistors Q2, Q5 and Q4, Q3. This would probably provide currents sufficiently high to destroy the switching transistors Q2, Q3, Q4, and Q5. The necessity for providing a dead period between the conduction of the transistor pairs comprising the inverter reduces the power available at the output. The dead period also means that the current through the transformer is pulsed causing substantial ripple in the output voltage.

Since voltage is applied to the inverter circuit by the capacitor C1, large peak currents are generated during switching through the transistors Q2–Q5. It is therefore necessary to include the impedance Z in series with the primary winding P for power levels above 100 watts in order to control the ratio of peak to average current. In a typical circuit, the impedance Z is selected to limit the peak current to a value approximately twice that of the average current. Thus, the transistors Q2–Q5 must be selected to withstand the passage of this higher value current therethrough, and accordingly, heavier duty (and more expensive) transistors must be used.

DESCRIPTION OF THE PREFERRED EMBODIMENT

Figure 2:
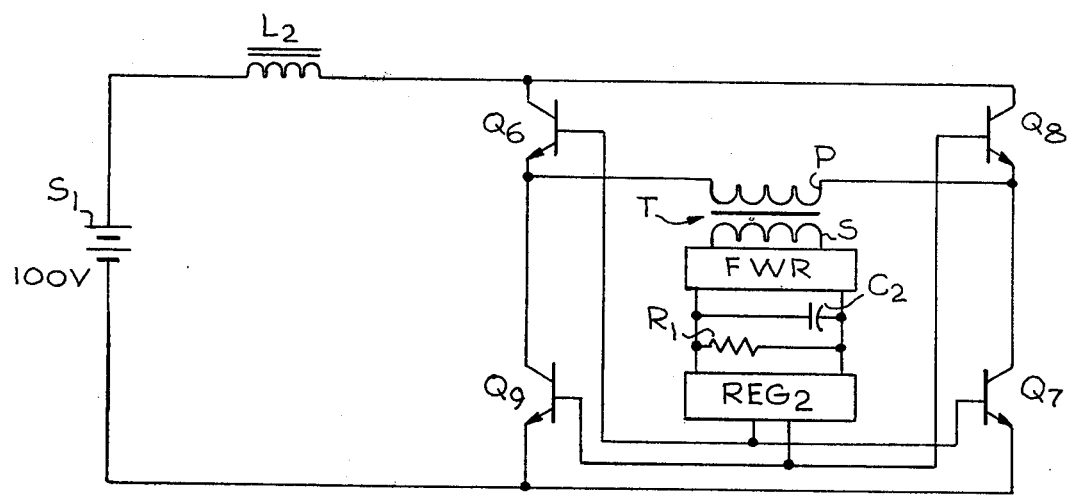
FIG. 2 is a circuit diagram of a first embodiment of a DC to DC power supply constructed in accordance with the invention and illustrates the inputs and outputs thereof.
Figure 2:
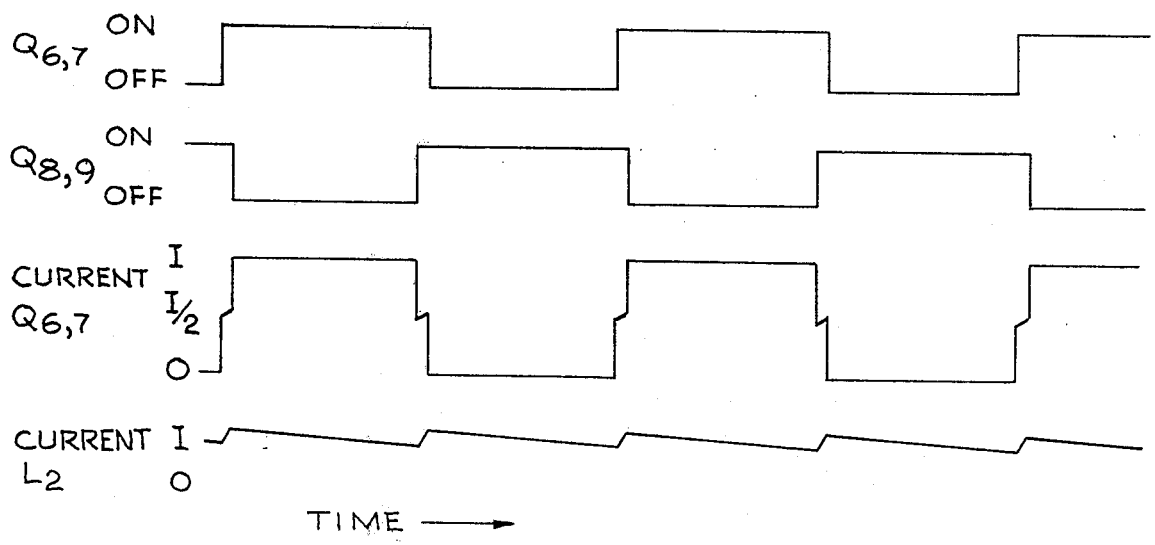

Referring now to FIG. 2, there is shown a circuit diagram of an improved DC to DC power supply constructed in accordance with the invention. In the circuit of FIG. 2, a DC voltage source S1 is connected in series with an inductor L2 across an inverter circuit including switching transistors Q6, Q7, Q8, and Q9. The switching transistors Q6 through Q9 are connected to provide paths through a primary winding P of a transformer T having a secondary winding S. The winding S is connected to a full wave rectifier FWR, which supplies DC power to load resistor $R_L$ in parallel with a filter capacitor C2. The voltage across the load resistor $R_L$ is measured by a regulator REG2 which provides switching inputs to the bases of the switching transistors Q6 through Q9.

As may be seen in the graphical illustrations of FIG. 2, the switching pairs of transistors Q6, Q7, Q8, Q9 are conducting during overlapping intervals. However, whereas in the circuit of the prior art shown in FIG. 1, such coincident on-time of switching pairs of transistors would short-circuit the input source and allow damaging peak currents to be provided through the switching transistors, in the present invention the inductor L2 acts to constrain a rapid increase in current, thereby eliminating the possibility of destroying the switching transistors Q6 through Q9 even though they are conducting coincidentally.

In operation, the voltage of the source S1 is applied across the switching transistors Q2 through Q5 to the primary winding P, first in one direction and then in the other direction. For example, if the transistors Q6 and Q7 are switched on by regulator REG, current from the source is transferred through those transistors and through the primary winding P in a first direction. When the transistor pair Q8, Q9 is turned on, the current is transferred in the opposite direction through the primary winding P. During the period of overlap in which the regulator REG2 turns on both pairs of switching transistors, two short circuits are provided and current (limited by the inductor L2) divides through the two paths so that the current through any one of the switching transistors essentially is halved. The short circuit serves the function of transistor Q1 in the current of FIG. 1, allowing a build up of current through the inductor L. The length of the overlap period is varied by the regulator REG2, increasing to provide more current through the inductor L2 and decreasing to provide less current through the inductor L2, consistent with maintaining the load voltage constant.

The circuitry of the regulator REG 2 is not shown because it is of a type quite well known in the art for providing enabling pulses to switching transistors in response to the value of the output voltage. The switching pulses have two control criteria; they must overlap and the period of overlap must increase as increased output voltage is desired. The increase in overlap allows the inductor L to charge for a longer period so that current therethrough to the load is higher.

As may be seen from FIG. 2, the circuit thereof is substantially reduced in complexity and is, consequently, more compact than that shown in FIG. 1. For example, the transistor Q1, the diode CR1, and the capacitor C1 are all eliminated. Elimination of switching transistor Q1 substantially reduces the electromagnetic interference generated in prior art circuits. In addition, the impedance Z shown in FIG. 1 is no longer necessary since the peak currents through the transistors are limited by the inductor L. Accordingly, the transistors Q6–Q9 may be selected to carry only the average current flowing therethrough, and less expensive transistors may be used.

Figure 3:
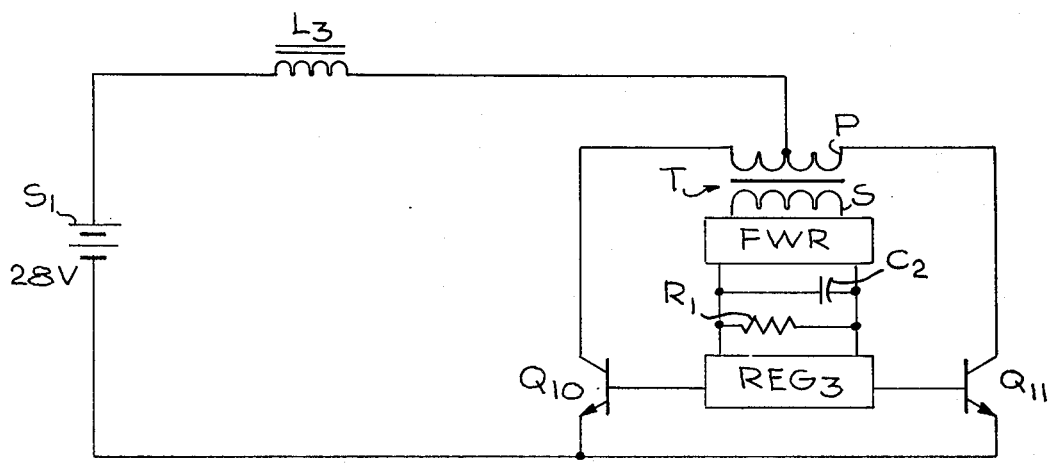
FIG. 3 is a circuit diagram of a second embodiment of a DC to DC power supply constructed in accordance with the invention and illustrates graphically the inputs and outputs thereof.
Figure 3:
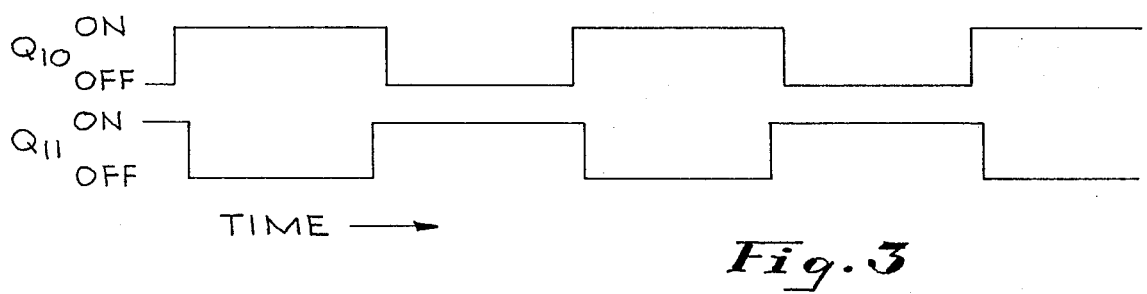

A particular circuit as shown in FIG. 2 constructed in accordance with the invention may utilize components of the following values:

S1—100 v.
L2—1 mh.
Q6—SVT 250-5B
Q7—SVT 250-5B
Q8—SVT 250-5B
Q9—SVT 250-5B
C2—0.1 microfurads, 5 kv
$R_L$—32 K ohms The circuit shown in FIG. 2 is most suitable for use with higher input voltages. For lower input voltages, the embodiment shown in FIG. 3 is preferred. The schematic circuit shown in FIG. 3 includes a DC voltage source S1 connected in series with an inductor L3 to the center of a primary winding P of a transformer T having a secondary winding S. The alternate ends of the primary winding P are connected by switching transistors Q10 and Q11 to the source S1. The secondary winding S is connected through the full wave rectifier FWR to a load resistance $R_L$ which is connected in parallel with a filter capacitor C2. The voltage across the load resistance $R_L$ is measured by a regulator REG3 which controls the on time of the switching transistors Q10 and Q11 in the same manner as the switching pairs of transistors in the circuit of FIG. 2. As may be seen from the on-off time graphs provided in FIG. 3, the switching transistors Q10 and Q11 are turned alternately on and off with a period of overlap therebetween as with the switching pairs of transistors in FIG. 2. Since a lower voltage is provided by the source S1, it is possible to use a single transistor for applying the input voltage provided by the source S1 to the load resistance $R_L$ without exceeding the voltage capacities of the switching transistors Q2 and Q4. As with the circuit of FIG. 2, the regulator REG3 provides the switching inputs to the transistors Q10 and Q11 to maintain those transistors in the on-off condition with regulated overlap periods.

As with the circuit of FIG. 2, elimination of the pre-inverter switching transistor reduces electromagnetic interference, elimination of dead time improves the output voltage regulation, and reduction of peak currents through the inverter transistors improves the peak to average current ratio allowing the use of less expensive transistors and eliminating the impedance z.

Obviously, other arrangements might be used to provide a DC to DC power supply such as that described herein. For example, various changes might be made in the form of the rectifying circuitry included in the circuit of the secondary winding S of the transformer T to provide voltage doubling or other output. Thus, while there have been shown and described preferred embodiments, it is to be understood that various other adaptations and modifications may be made which fall within the spirit and scope of the invention.

What is claimed is:

1. A regulated DC to DC power supply comprising a transformer having primary and secondary windings, first means for switching current in a first direction through the primary winding, second means for switching current in the opposite direction through the primary winding, a load, a rectifier circuit connected between the load and the secondary winding, an inductor for furnishing current from a source directly to the first and second means for switching current through the primary winding, and a regulator for measuring the load voltage to control the first and second means for switching current through the primary winding so that conduction time for the first and second means overlaps.

2. A DC to DC power supply comprising a transformer having a primary winding and a secondary winding, a first transistor for switching current in a first direction through the primary winding, a second transistor for switching current in a second direction through the primary winding, means for limiting the current provided from a DC voltage source to the first and second transistors, a load, a rectifier circuit connecting the load to the secondary winding, and regulator means responsive to the voltage at the load for causing the first and second transistors to conduct alternately during overlapping time periods, the degree of overlap increasing with decreasing load voltage.

3. A DC to DC power supply as claimed in claim 2 further comprising a third transistor for switching current in the first direction through the primary winding, and a fourth transistor for switching current in the second direction through the primary winding, the third and fourth transistors being controlled by the regulator means to conduct with the first and second transistors, respectively.

4. A DC to DC power supply as claimed in claim 2 in which the means for limiting current comprises an inductor.

5. A power supply for providing DC output voltage from a DC source voltage comprising a transformer having primary and secondary windings, an inductor connected to the DC source voltage for limiting the current furnished thereby, first transistor switching means for causing current through the inductor to flow in a first direction through the primary winding, second transistor switching means for causing current through the inductor to flow in a second direction through the primary winding, a load, a rectifier circuit connecting the load to the secondary winding, and means responsive to load voltage for operating the first and second transistor switching means alternately during overlapping time periods, the duration of the overlap increasing with decreasing average load voltage.

* * * * *